(12) United States Patent
Hamanaka et al.

(10) Patent No.: US 7,229,561 B1
(45) Date of Patent: Jun. 12, 2007

(54) METHOD OF IN-PIPE ACTIVATION OF RUNNING WATER AND IN-PIPE ACTIVATOR FOR RUNNING WATER AS WELL AS METHOD OF MAINTAINING BODY TEMPERATURE BY WAY OF PROMOTING BLOOD FLOW

(75) Inventors: Hiroyoshi Hamanaka, 2-2-105, Murakami 1113 Banchi 1, Yachiyo shi, Chiba 272-0027 (JP); Toshio Ikeuchi, Chiba (JP)

(73) Assignee: Hiroyoshi Hamanaka, Chiba (JP)

( * ) Notice: Subject to any disclaimer, the term of this patent is extended or adjusted under 35 U.S.C. 154(b) by 292 days.

(21) Appl. No.: 10/789,168

(22) Filed: Feb. 27, 2004

(51) Int. Cl.
*C02F 1/48* (2006.01)
*A61B 17/52* (2006.01)

(52) U.S. Cl. .......................... 210/695; 210/222; 600/9; 99/275

(58) Field of Classification Search ................ 604/304; 600/15, 9; 210/222, 223, 695; 123/538; 99/275
See application file for complete search history.

(56) References Cited

U.S. PATENT DOCUMENTS

| 4,605,498 | A | * | 8/1986 | Kulish ........................ 210/222 |
| 4,976,706 | A | * | 12/1990 | Aki et al. ..................... 600/15 |
| 5,882,292 | A | * | 3/1999 | Miyaguchi ................... 600/15 |
| 2003/0196946 | A1 | * | 10/2003 | Denzer ........................ 210/223 |

FOREIGN PATENT DOCUMENTS

JP   2004082025 A  *  3/2004
JP   2005081228 A  *  3/2005

* cited by examiner

*Primary Examiner*—David A. Reifsnyder
(74) *Attorney, Agent, or Firm*—Dilworth & Barrese LLP

(57) ABSTRACT

The invention offers the equipment for an in-pipe running water activation method that is simple to operate and provides long-term stable performance while being beneficial to humans and to the environment.

The invention relates to an in-pipe running water activation method and equipment characterized in that use is made of the action of the infrared radiation that is emitted from germanium-including biotite placed in the vicinity of a repulsive magnetic field generated by permanent magnet north poles arranged in mutually opposing positions.

12 Claims, 7 Drawing Sheets fig3 fig4 fig5 fig6 fig7 fig8 fig9 fig10 fig11 fig12 fig13

METHOD OF IN-PIPE ACTIVATION OF RUNNING WATER AND IN-PIPE ACTIVATOR FOR RUNNING WATER AS WELL AS METHOD OF MAINTAINING BODY TEMPERATURE BY WAY OF PROMOTING BLOOD FLOW

TECHNICAL FIELD

This invention relates to a method of in-pipe activation of running water and an in-pipe activator for running water, and refers, more specifically, to an activator for running water using a combination of infrared radiation and magnetic repulsive forces.

PRIOR STATE OF THE ART

Our present world faces, in particular, the worrying challenge of the exhaustion of the earth's water resources and the additional threat of pollution progressively affecting river and rainwater. In order to collect such water resources and turn them to potable supply water that can be supplied safely to large populations, it is necessary to use considerable amounts of chemical agents such as sterilizing agents and absorbents for impurities as well as pH adjusting agents.

Similarly, the "utility" water used for cleaning equipment or workplaces in factories as well as the familiar fresh and seawater used for agriculture and fish farming require some caution. Without due care the use of such water may have a negative effect.

In view of these apprehensions, there is an increasing social demand for potable water that is both safer to drink and has a better taste. Various practices have therefore been established to achieve this goal by various means: Some methods inject calcium at the time of drinking and remove chlorine ions after sterilizing. Other methods use a reverse osmosis membrane to inhibit bacterial permeation. Some methods also use activated carbon to adsorb admixed impurities.

Furthermore, some schemes have been known and tried for a long time to achieve this goal without direct contact with the water by installing one or a plurality of permanent magnets in the water supply pipe or faucet to impart the water molecules with an electric charge in the magnetic field thereof. Also suggested has been the idea of a system that uses a combination of magnetic forces with infrared radiation emitting substances in order to enhance this phenomenon.

DISCLOSURE OF THE INVENTION

Problem to be Resolved by this Invention

However, the various chemical treatment methods referred to herein above have the shortcoming that the materials used for treatment are susceptible to functional deterioration. They therefore require adjusting or replenishing when necessary, thus giving rise to difficulties and considerable tedium due to the absence of clear standards. There are further significant problems. Thus, when physical treatment methods involving the use of magnetic forces and infrared radiation are employed it is necessary to generate a magnetic field in the flowing water in order to achieve a visible effect. This necessitates the use of a permanent magnet with a very strong magnetic force. The installation of such equipment therefore require considerable caution and even after installation there remains a considerable risk that the strong residual magnetic flux density of the equipment as a whole might impede the normal functioning of IC-related precision equipment in the vicinity.

Furthermore, magnetic water activators equipped with the familiar permanent magnet combination and additionally provided with an infrared radiation emitting substance present a number of difficulties in that the magnetic forces acting on the water have a small range and therefore a poor water-quality improving effect so that the system though convenient for in-pipe purification does present the problem that the flowing water leaving the system soon reverts to a quality not significantly different from the untreated (raw) water.

Means by which the Invention Tries to Resolve the Problem

The inventors have conducted in-depth research with a view to resolving these problem and for the purpose of developing an in-pipe running water activator free from the possibility of exerting an adverse effect on the environment and shown to maintain stable performance over a long time while being simple install and easy to operate. The result of their intense studies led to the present invention in that it was found that when water is allowed to flow through the pipe after arranging in mutually opposite positions permanent magnets provided with a particular infrared radiation emitting substance under low temperature conditions near the limited electrode and bringing them in contact with the water supply pipe and/or faucet or its extension fitting the water is activated at high efficiency without applying any chemical treatment whatsoever.

The first invention is thus a method of in-pipe running water activation characterized in that the N poles of permanent magnets are arranged in mutually opposing positions in the water supply pipe, the water circulation pipe and/or the faucet or the extension fitting and in that a repulsive magnetic field is induced in the pipe in such a manner that the infrared radiation emitted from germanium-including biotite is brought in close proximity to the surface of the permanent magnets referred to herein above is allowed to act on the water.

The second invention is a method of in-pipe water activation in accordance with claim 1 herein above characterized in that the afore-described germanium-including biotite is used as a powder coated on to the surface of the permanent magnets or coated onto a ferromagnetic sheet and attached to the permanent magnets, or alternatively used in powder or granular form brought into movable contact with the permanent magnets or alternatively it is used as a magnet-bonded molding by mixing it with a ferromagnetic powder and bonding it to the magnet.

The third invention is an in-pipe running water activator characterized in that the permanent magnet with the germanium-including biotite bonded on to it is positioned in the inner surface 4 of the roughly U-shaped retaining detail and an auxiliary retaining detail 3 is used to hold the upper surface of the aforesaid magnet in position.

The fourth invention is an in-pipe running water activator in accordance with claim 3 herein above characterized in that the aforesaid permanent magnet is a permanent magnet consisting of magnetic strips obtained by baking germanium-including biotite and a resin-type paint on to the magnet and thereupon bonding the paint film coat under magnetic force.

The fifth invention is an in-pipe running water activator characterized in that the germanium-including biotite granules and the permanent magnet are contacted and filled in a box-shaped retaining detail 11.

The sixth invention is an in-pipe running water activator characterized in that it consists of a bonded magnet molding obtained in such a manner that a germanium-including biotite powder and a ferromagnetic powder are brought together and processed to bond to the magnet.

The seventh invention is an in-pipe running water activator characterized in that a permanent magnet 1 that has germanium-including biotite attached to the mutually opposing N poles on the inner side is pressure-fitted on to a retaining detail 3.

The eight invention in accordance with claim 7 herein above is an in-pipe running water activator characterized in that it is a permanent magnet consisting of a magnetic board obtained in such a manner that the aforementioned permanent magnet is treated by baking the germanium-including biotite powder and a resin paint thereon and causing it to be attached by magnetic force after the paint film has been applied.

The ninth invention is an in-pipe running water activator characterized in that the germanium-including biotite powder and the permanent magnet whose N poles are arranged in a mutually opposing position are contacted and filled with the retaining detail.

The tenth invention is a method of maintaining body temperature by way of promoting blood flow achieved by implanting in the body an indwelling in-pipe running water activator consisting of a bonded magnet molding obtained in such as manner that a germanium-including biotite powder and a ferromagnetic powder are brought together and processed to bond to the magnet.

EXPLANATION OF SYMBOLS

1. Permanent magnet
2. Germanium-including biotite
3. Auxiliary retaining detail
4. Retaining detail
5. Fixing wire for unit installation
6. Pipe
7. Steel plate
8. Fixing screw for unit installation
9. Fixing clamp for unit installation
10. Fixing adhesive tape for unit installation

OPTIMUM MODE FOR EMBODYING THE INVENTION

This invention does not depend on the selection of any particular type of permanent magnet, and a ferrite magnet or a rare-earth type magnet may be used. It is also possible to use a bonded magnet consisting of permanent magnet powder and plastic or rubber.

This invention requires biotite in which germanium has been effectively included between layers as the infrared radiation reflecting materials under low temperature conditions.

This invention requires, furthermore, the arrangement of the N poles in mutually opposing positions so that the repulsive force acting between these poles can act on the running water. In this context, the running water is not limited to any particular type and may be natural water or supply water or utility water that is not drinking water, and it may also be sea water or even water containing detergents, or preservatives mixed therein, or, for that matter, it may even be a potable water solution containing food materials.

This invention does not limit the material for the ferromagnetic plate onto which the germanium-including biotite power is painted to any particular type of material, and it is possible to use, for example, materials containing iron, cobalt, or nickel.

This invention requires that a minimum of two permanent magnets fixed onto a retaining detail be provided and that furthermore, these two magnets be arranged in mutually opposing positions in order that the repulsive forces between the N poles on the inner side will effectively act upon the running water inside the pipe. The manner in which this mutually opposing arrangement can be assured may involve either the use of a retaining detail after arrangement or the automatic retention thereof inside the fixing detail by virtue of the repulsive forces between the N poles. After this, the in-pipe running water activator of this Invention assembled in the pipe or in the connection between the pipe and the faucet or in the extension part of the faucet is operated.

EMBODIMENTS OF THIS INVENTION

The following explains the invention by referring to its embodiments, practical examples and panel test examples. However, the technology and benefits of the in-pipe running water activator according to this Invention shall not be limited to the practical examples below.

Embodiment 1

After applying a 50 μm thick epoxy coat containing 65% of germanium-including biotite powder (made by SEO-BONG BioBestech Co., Ltd. Republic of Korea) with an average grain size of 5 μm to the entire surface of a samarium iron nitrogen magnet with a 4800 Gauss magnetic surface force worked to a 18 mm×50 mm×43 mm angular shape, a member is prepared as shown in FIG. 1 with the N poles placed at the top and fixed to the retaining detail consisting of SUS316L stainless steel and ABS resin.

Figure 1:
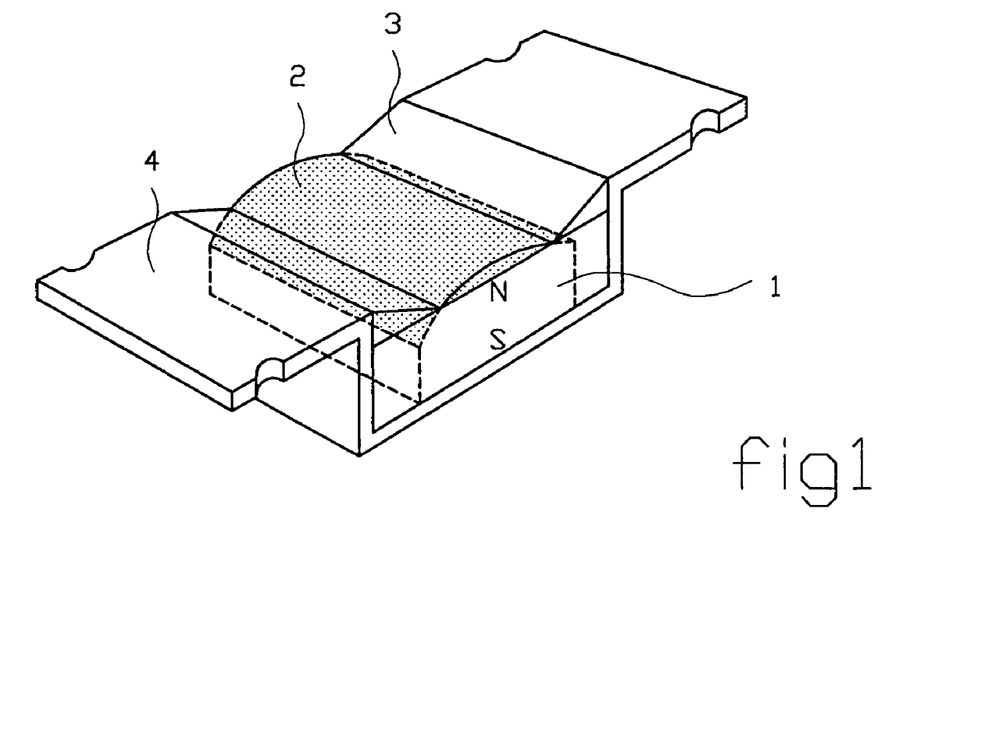
FIG. 1 is a cross-eye view of the in-pipe running water activator unit being the embodiment 1 of this Invention.
Figure 2:
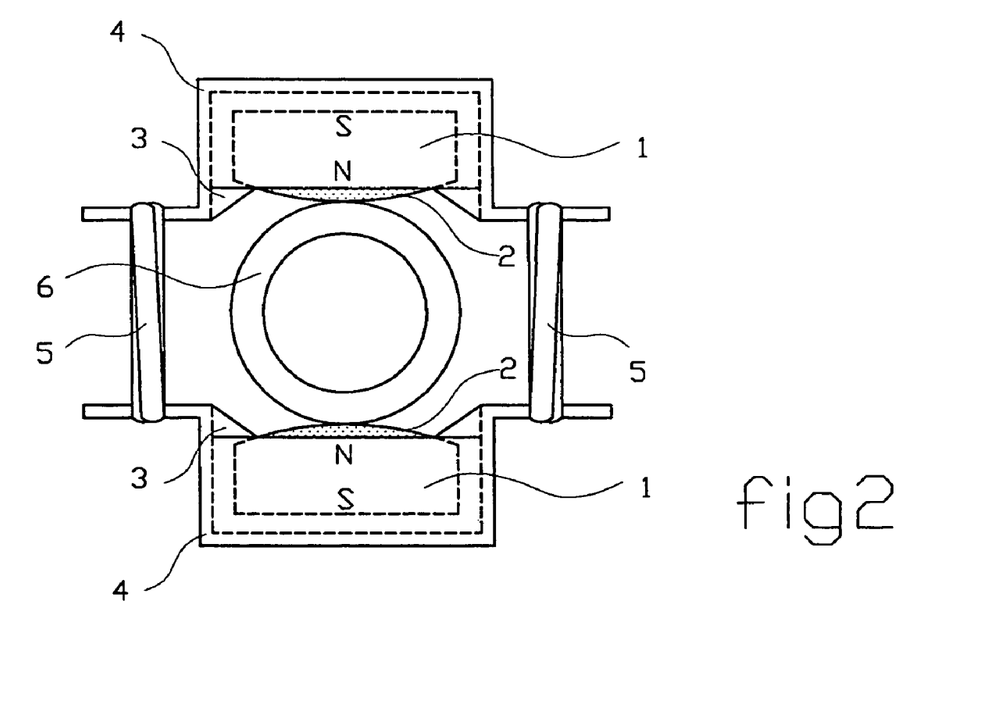
FIG. 2 is a cross-sectional view of the in-pipe running water activator in the embodiment 1 according this Invention installed in a stainless steel water faucet.

Thereupon two of the members shown in FIG. 1 are placed facing each other between a household stainless steel water faucet (having an outer diameter of 16 mm) and the two ends thereof are tied together with copper wire as shown in FIG. 2 to complete the in-pipe running water activator according to this invention.

Embodiment 2

After fixing a neodymium iron boron magnet with a 4350 Gauss magnetic surface force worked to a 18 mm×50 mm×43 mm angular shape onto a retaining detail consisting of SUS316L stainless steel and ABS resin with N poles positioned at the top in the same manner as in the first embodiment, this was baked on to a 0.6 mm thick iron plate (having a size of 13 mm×25 mm) with a mixture consisting of 60% of germanium-including biotite powder (made by SEOBONG BioBestech Co., Ltd. Republic of Korea) with an average grain size of 5 μm and 40% of an oil-based 1 liquid type acrylic resin paint and the member holding the finished plate with a 60 μm thick paint coat by magnetic force is completed as shown in FIG. 3.

Figure 3:
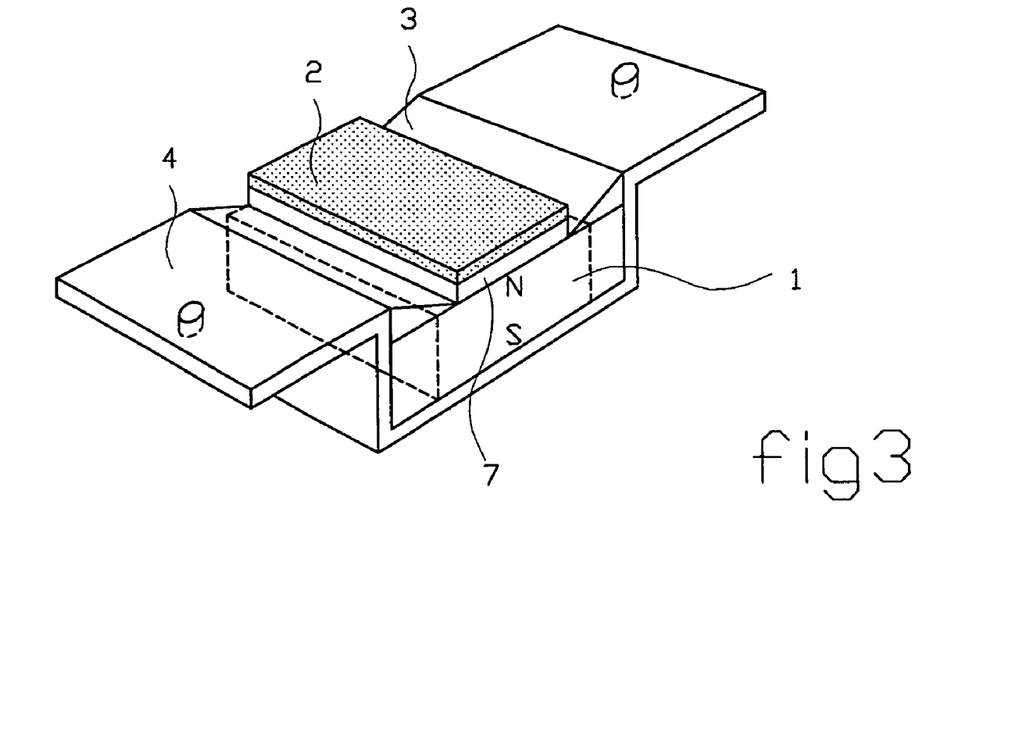
FIG. 3 is a cross-eye view of the in-pipe running water activator unit being the embodiment 2 of this Invention.
Figure 4:
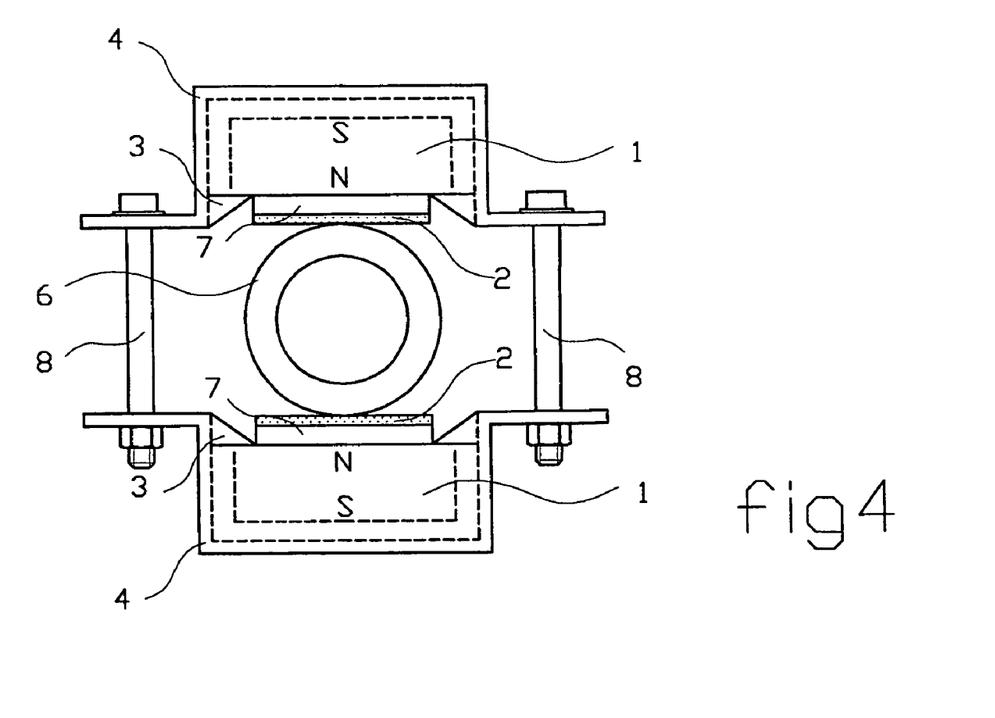
FIG. 4 is a cross-sectional view of the in-pipe running water activator in the embodiment 2 according this invention installed in a stainless steel water faucet.

Thereupon two of the members shown in FIG. 3 are placed facing each other between a household stainless steel water faucet (having an outer diameter of 16 mm) and the two members are fastened together with screws in two locations as shown in FIG. 4 to complete the in-pipe running water activator according to this invention.

Comparative Example 1

Two members with the N poles placed at the top and fixed to the retaining detail consisting of SUS316L stainless steel and ABS resin are fabricated without paint-coating the samarium iron nitrogen magnet identical with that of the embodiment 1 with germanium-including biotite, and said two members are tied together with wire facing each other in a household water faucet in the same manner as in the embodiment 1.

Comparative example 2

After fixing the same neodymium iron boron magnet as that of the embodiment 2 onto a retaining detail consisting of SUS316L stainless steel and ABS resin with the N poles positioned at the top, a mixture consisting of 60% of biotite powder (being a product with a hardness of 2.7 and a specific gravity of 3.0, sampled from Pegmatite) with an average grain size of 5 μm and 40% of an oil-based 1 liquid type acrylic resin paint is baked on to a 0.6 mm thick iron plate (having a size of 13 mm×25 mm) and two members holding the detail coated with the 60 μm thick film by magnetic force are prepared and arranged in a household water faucet in such a manner as to face each other similarly to the embodiment 2 and fastened together with screws.

Comparative Example 3

After fixing the same neodymium iron boron magnet as that of the embodiment 2 onto a retaining detail consisting of SUS316L stainless steel and ABS resin with the N poles positioned at the top, a mixture consisting of 60% of 5 μm grain-size iron-oxide zirconium-oxide containing infrared reflecting silica alumina ceramic powder and 40% of an oil-based 1 liquid type acrylic resin paint is baked on to a 0.6 mm thick iron plate (having a size of 13 mm×25 mm) and two members holding the detail coated with the 60 μm thick film by magnetic force are prepared and arranged in a household water faucet in such a manner as to face each other similarly to the embodiment 2 and fastened together with screws.

Comparative Example 4

After fixing the same neodymium iron boron magnet as that of the embodiment 2 onto a retaining detail consisting of SUS316L stainless steel and ABS resin with the N poles positioned at the top, a mixture consisting of 60% of germanium-including biotite powder (made by SEOBONG BioBestech Co., Ltd. Republic of Korea) with an average grain size of 5 μm and 40% of an oil-based 1 liquid type acrylic resin paint is baked on to a 0.6 mm thick iron plate (having a size of 13 mm×25 mm) and two members holding the detail coated with the 60 μm thick film by magnetic force are prepared and arranged in a household water faucet in such a manner as to face each other similarly to the embodiment 2 and fastened together with screws.

Embodiment 3

Figure 5:
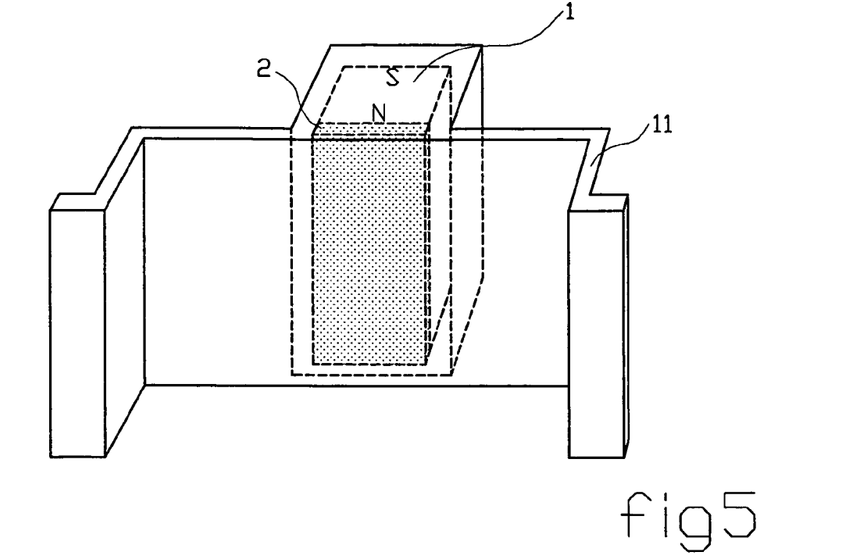
FIG. 5 is a cross-eye view of the in-pipe running water activator unit being the embodiment 3 of this Invention.
Figure 6:
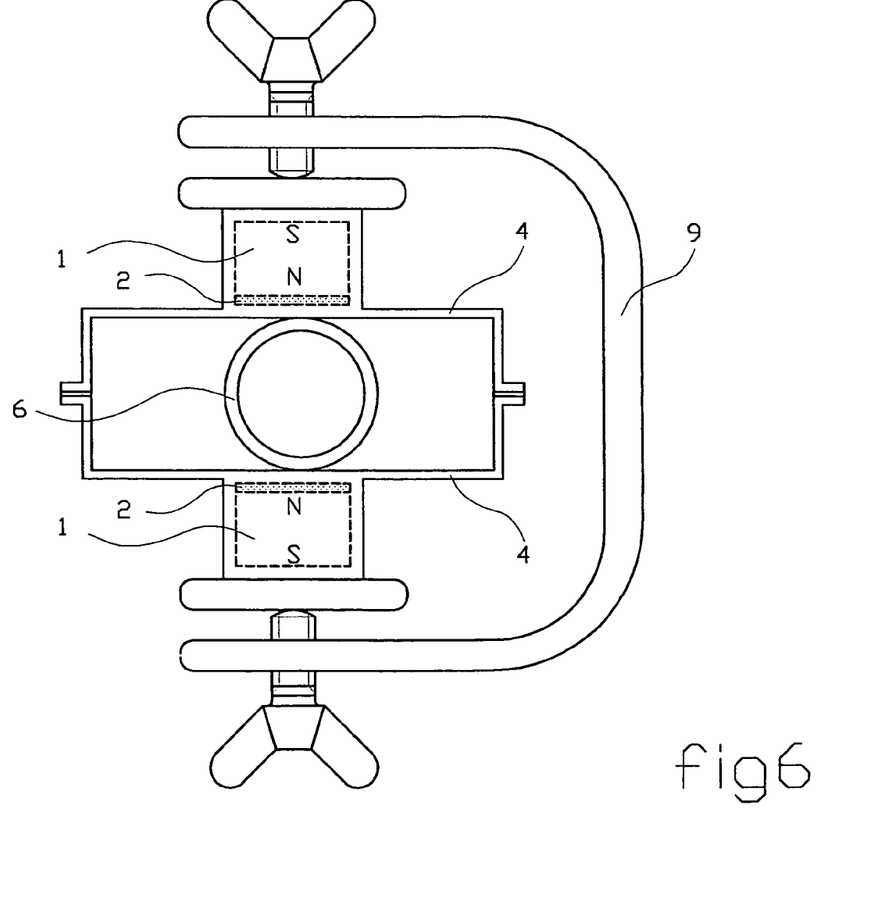
FIG. 6 is a cross-sectional view of the running water activator in the embodiment 3 installed in a polyvinyl chloride water pipe.

A ferrite magnet with a 7500 Gauss magnetic surface force worked to a 25 mm×60 mm×50 mm angular shape and 2 g of germanium-including biotite granules (made by SEOBONG BioBestech Co., Ltd. Republic of Korea) with an average grain size of 1 mm are filled into a box-shaped retaining detail consisting of SUS316L stainless steel and a sealed fixing member with N poles positioned on the outer surface as shown in FIG. 5 is prepared. Thereupon two of the members shown in FIG. 5 are placed between a commercial PVC water main pipes fastened together with the clamps shown in FIG. 6 to complete the in-pipe running water activator according to this invention.

Comparative Example 5

Figure 7:
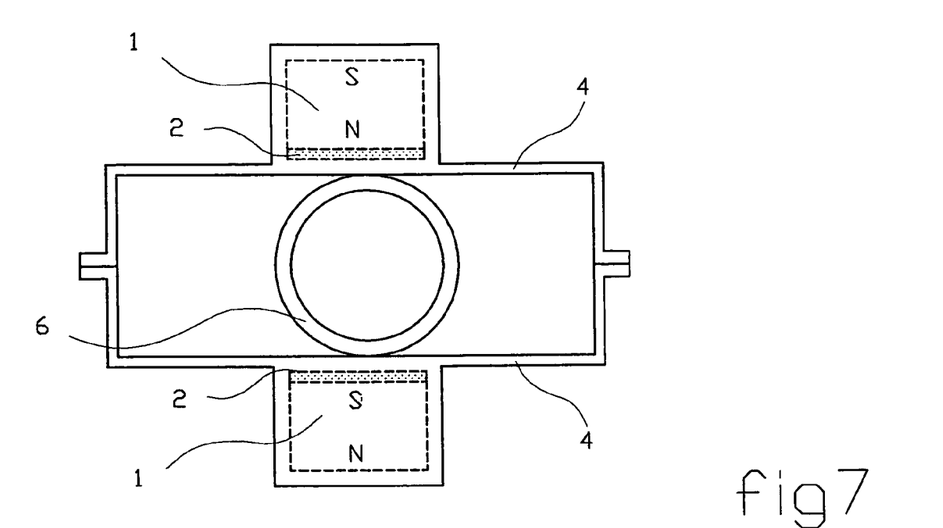
FIG. 7 is a cross-sectional view of the magnet device being the embodiment 5 of this Invention installed in a polyvinyl chloride water pipe.

Two ferrite magnets identical to those of the embodiment 3 are provided and selected in such a manner that one will become the N pole surface and one the S pole surface, and after these ferrite magnets together with 2 g of germanium-including biotite (made by SEOBONG BioBestech Co., Ltd. Republic of Korea) have been sealed and fixed in a box-shaped retaining detail consisting of SUS316L stainless steel, the detail is fixed directly by the magnetic attraction force in a commercial PVC water mains pipe (having an outer diameter of 20 mm), as shown in FIG. 7.

Embodiment 4

After 18 parts by weight of ethylene vinyl chloride resin with an average-polymerization degree of 800, a tensile strength (MPa) of 47.7, and a softening point of 64 deg.C., 4 parts by weight of a germanium-including biotite powder with an average grain size of 5 μm (made by SEOBONG BioBestech Co., Ltd. Republic of Korea) and 78 parts by weight of samarium iron nitrogen powder with an average grain size of 1 μm had been prepared in a Brabender and mixed, the mixture was extrusion-molded in a calender under kneading conditions corresponding to 160–170 deg.C and 15 seconds to produce an angular strip of 7 mm width and 4 mm thickness and the strip was worked to obtain a member for magnetic retention with a magnetic surface force of 1400 Gauss in such a manner that the outer and inner sides of the broad surface of said strip became the N and S poles, respectively.

Figure 8:
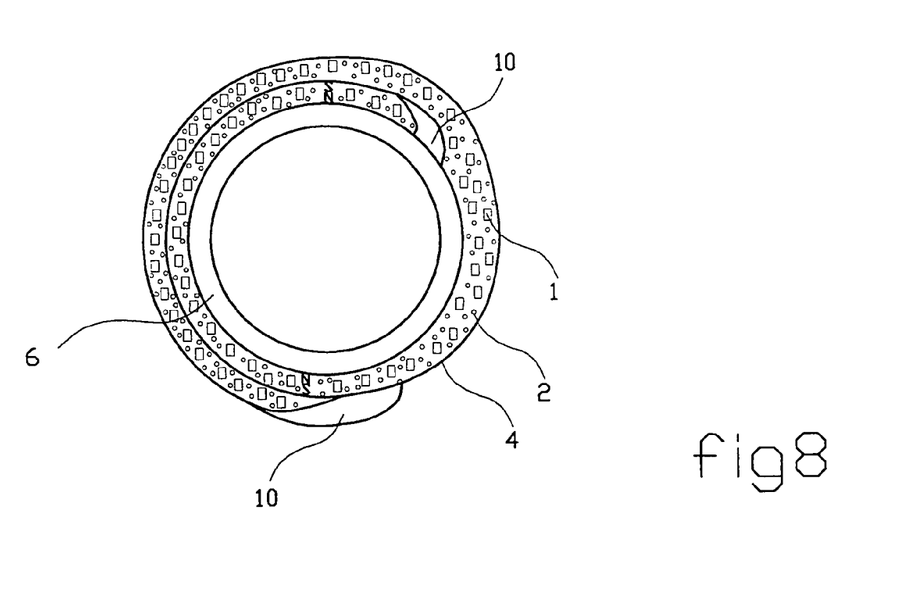
FIG. 8 is a cross-eye view of the running water activator in the embodiment 4 according this Invention installed in a stainless steel water pipe.

After the N pole had thereupon been wound over a distance of 15 cm on to a commercial PVC water mains pipe (having an outer diameter of 20 mm) with the N pole becoming the inner side, both ends were fastened with cloth rubber tape as shown in FIG. 8 to obtain the in-pipe running water activator of this Invention.

Application Example 1

After the in-pipe running water activator according to the embodiments 1–4 of this invention and the magnet devices of the comparison examples 1–5 had been severally and separately installed on a household or commercial water supply unit (used in all cases within Shinjuku-ku, Tokyo for supply water and river water) and the water had been allowed to flow for 10 minutes, 1 kg samples of the water were taken using a 1 liter beaker. Thereupon ten small fish of the himedaka species were placed into each of the water samples for fish toxicity testing; the beaker was sealed by wrapping wrapping-foil over it and standing it under temperature and humidity controlled conditions at 23 deg. C. and 50% RH and the number of himedaka fish dying in the course of time was observed. The results are presented in Table 1.

TABLE 1

| Water Sample | Number of himedaka dying | | | | |
|---|---|---|---|---|---|
| | After 1 day | After 3 days | After 5 days | After 7 days | Total |
| Supply/River water | 1 | 4 | 3 | 2 | 10/10 |
| Supply water passing through the running water activator of embodiment 1 | 0 | 1 | 0 | 0 | 1/10 |
| Supply water passing through the running water activator of embodiment 2 | 0 | 1 | 0 | 0 | 1/10 |
| Supply water passing through the running water activator of embodiment 3 | 0 | 2 | 0 | 0 | 2/10 |
| Supply water passing through the running water activator of embodiment 4 | 0 | 2 | 0 | 0 | 2/10 |
| Supply water passing through the magnet device of comparative example 1 | 1 | 3 | 2 | 1 | 7/10 |
| Supply water passing through the magnet device of comparative example 2 | 1 | 2 | 2 | 2 | 7/10 |
| Supply water passing through the magnet device of comparative example 3 | 0 | 1 | 4 | 3 | 8/10 |
| Supply water passing through the magnet device of comparative example 4 | 1 | 2 | 3 | 3 | 9/10 |
| Supply water passing through the magnet device of comparative example 5 | 0 | 3 | 3 | 2 | 8/10 |

As can be seen from Table 1, it has been established that once the running water has passed through the installation-point of the in-pipe running water activator according to this Invention it retains its activated state thereafter for a long time and exerts a favorable action on the physiological activity of animals.

Application Example 2

After the in-pipe running water activator according to the embodiments 1–4 of this invention and the magnet devices of the comparison examples 1–5 had been severally and separately installed on a household or commercial water supply unit (used in all cases within Yachiyo City, Chiba Prefecture for supply water and river water) and immediately after the water had been allowed to flow, 20 g samples of the water were taken each at a rate of twice daily and sprayed, in each case, on the soil in which snapdragon plants had been planted for cultivation in 400 g of pot plant growing soil prepared with the addition of 10% of leaf mold. Thereupon the plants were observed in the course of time to determine the day pn which the plant flowered. The results are presented in Table 2.

TABLE 2

| Water Sample | Number of days until the pot-grown snapdragon plant came into flower |
|---|---|
| Supply/River water | 14 days or more |
| Supply water passing through the running water activator of embodiment 1 | 6 days |
| Supply water passing through the running water activator of embodiment 2 | 5 days |
| Supply water passing through the running water activator of embodiment 3 | 7 days |
| Supply water passing through the running water activator of embodiment 4 | 7 days |
| Supply water passing through the magnet device of comparative example 1 | 13 days |
| Supply water passing through the magnet device of comparative example 2 | 13 days |
| Supply water passing through the magnet device of comparative example 3 | 12 days |
| Supply water passing through the magnet device of comparative example 4 | 14 days or more |
| Supply water passing through the magnet device of comparative example 5 | 12 days |

As can be seen from Table 2, it has been established that the use of the in-pipe running water activator according to this Invention creates water with a favorable action on the physiological activity of plants.

Application Example 3

After the in-pipe running water activator according to the embodiments 1–4 of this invention and the magnet devices of the comparison examples 1–5 had been severally and separately installed on a household or commercial water supply unit (used in all cases within Chiba City, Chiba Prefecture for supply water and river water) and immediately after the water had been allowed to flow, 500 g samples of the water were taken each in a 1 liter beaker. Thereupon five mini-tomatoes were introduced into each of these samples under temperature-controlled conditions at 20 deg.C and after the tomatoes had remained immersed for 30 minutes they were cut and the extracted juice was analyzed to determine its sugar content using a portable ATAGO refractometer and the mean sugar content was calculated. The results are presented in Table 3.

TABLE 3

| Water Sample | Sugar content of mini-tomatoes after immersion for 30 minutes (degree) |
|---|---|
| Supply/River water | 5.3 |
| Supply water passing through the running water activator of embodiment 1 | 6.5 |
| Supply water passing through the running water activator of embodiment 2 | 6.6 |
| Supply water passing through the running water activator of embodiment 3 | 6.6 |
| Supply water passing through the running water activator of embodiment 4 | 6.6 |
| Supply water passing through the magnet device of comparative example 1 | 5.8 |
| Supply water passing through the magnet device of comparative example 2 | 5.8 |
| Supply water passing through the magnet device of comparative example 3 | 5.9 |
| Supply water passing through the magnet device of comparative example 4 | 5.7 |
| Supply water passing through the magnet device of comparative example 5 | 5.7 |

As can be seen from Table 3, it has been established that the use of the in-pipe running water activator according to this Invention has a superior effect in enhancing the commercial value of vegetables even after their shipment.

Panel Test Example

The following panel tests were carried out and the results obtained are given below.

Panel Test 1

For the test, 100 male or female respondents aged between 20 and 70 years and cooking rice and meals at their homes or at their workplaces were randomly selected. Water samples of the water flowing from the household or commercial water supply units (used in all cases within Chiba City, Chiba Prefecture for supply water and river water) that had each been fitted with the in-pipe running water activator according to the embodiments 1–4 of this invention and the magnet devices of the comparison examples 1–5 were taken and the respondents were asked to pour each type of the samples five times at a rate of 1.5 liters each into each of the ten electric rice cookers to wash 300 g of polished rice (being Chiba Koshihikari rice) and cook the rice immediately thereafter. Thereupon each of the tern respondents was asked to taste one type of the cooked rice and to evaluate the appearance of the rice prior to eating and to assess the taste quality of the rice on eating. The results are presented in Table 4 in accordance with the following assessment criteria.

(1) Appearance of Cooked Rice

The criteria for evaluation were as follows.

A. All of the ten taste evaluation members judge that the finished cooked rice had a pure white appearance.

B. Seven to nine of the ten taste-evaluation members judge that the finished cooked rice had a pure white appearance.

C. Five to six of the ten taste evaluation members judge that the finished cooked rice had a pure white appearance.

D. Six or more of the ten taste evaluation members judge that the finished cooked rice had a yellowish appearance.

(2) Taste Quality on Eating

A. All of the ten taste evaluation members judge that the cooked rice is particularly delicious.

B. Seven to nine of the ten taste evaluation members judge that the cooked rice is particularly delicious.

C. Five to six of the ten taste evaluation members judge that the cooked rice is particularly delicious.

D. Four or fewer of the ten taste evaluation members judge that the cooked rice is particularly delicious.

TABLE 4

| Water Sample | Appearance of cooked rice | Taste quality |
|---|---|---|
| Supply/River water | D | D |
| Supply water passing through the running water activator of embodiment 1 | A | A |
| Supply water passing through the running water activator of embodiment 2 | A | A |
| Supply water passing through the running water activator of embodiment 3 | A | A |
| Supply water passing through the running water activator of embodiment 4 | A | A |
| Supply water passing through the magnet device of comparative example 1 | C | C |
| Supply water passing through the magnet device of comparative example 2 | B | C |
| Supply water passing through the magnet device of comparative example 3 | C | C |
| Supply water passing through the magnet device of comparative example 4 | D | C |
| Supply water passing through the magnet device of comparative example 5 | C | C |

As can be seen from Table 4, the running water passing through the in-pipe running water activator according to this Invention generates a very beneficial effect in the preparation of food.

Panel Test 2

For the test, 100 male or female respondents aged between 16 and 75 years were randomly selected. Water samples of the water flowing from the water supply units that had each been fitted with the in-pipe running water activator according to the embodiments 1–4 of this invention and the magnet devices of the comparison examples 1–5 were taken and the respondents were asked to fill 150 liters of each type of the water samples into ten household bath tubs whereupon the water was heated and its temperature maintained at 40 deg. C. Thereupon each of the ten respondents were asked to bathe in one type of heated water sample respectively and evaluate the atmosphere experienced while bathing and the condition of the wastewater in the tube ten minutes after allowing it to cool naturally. The results are presented in Table 5 in accordance with the following assessment criteria.

(1) Atmosphere Experienced while Bathing

The assessment criteria were as follows.

A. All of the ten bathing panel members judge that the hot water felt soft and that it was agreeable.

B. Seven to nine of the ten bathing panel members judge that the hot water felt soft and that it was agreeable.

C. Five to six of the ten bathing panel members judge that the hot water felt soft and that it was agreeable.

D. Four or fewer of the ten bathing panel members judge that the hot water felt soft and that it was agreeable.

(2) Condition of Wastewater in the Tub 10 Minutes after Allowing to Cool Naturally.

The assessment criteria were as follows.

⊚ All of the ten bathing panel members judge that the inside walls of the tube have no scum attaching to it at all.

○ Seven to nine of the ten bathing panel members judge that the inside walls of the tube have no scum attaching to it at all.

Δ Five to six of the ten bathing panel members judge that the inside walls of the tube have no scum attaching to it at all.

× Four or fewer of the ten bathing panel members judge that the inside wall of the tube have no scum attaching to it at all.

TABLE 5

| Water Sample | Atmosphere while bathing | Condition of wastewater in tub 10 minutes after natural cooling |
|---|---|---|
| Supply/River water | D | x |
| Supply water passing through the running water activator of embodiment 1 | A | ⊚ |
| Supply water passing through the running water activator of embodiment 2 | A | ⊚ |
| Supply water passing through the running water activator of embodiment 3 | A | ⊚ |
| Supply water passing through the running water activator of embodiment 4 | A | ⊚ |
| Supply water passing through the magnet device of comparative example 1 | C | Δ |
| Supply water passing through the magnet device of comparative example 2 | C | Δ |
| Supply water passing through the magnet device of comparative example 3 | C | Δ |
| Supply water passing through the magnet device of comparative example 4 | D | X |
| Supply water passing through the magnet device of comparative example 5 | C | Δ |

As can be seen from Table 5, the running water passing through the in-pipe running water activator according to this Invention results in an extremely favorable condition for bathing, an activity essential to a healthy life, and also for the cleaning of the bath tub after bathing.

Embodiment 5

Figure 9:
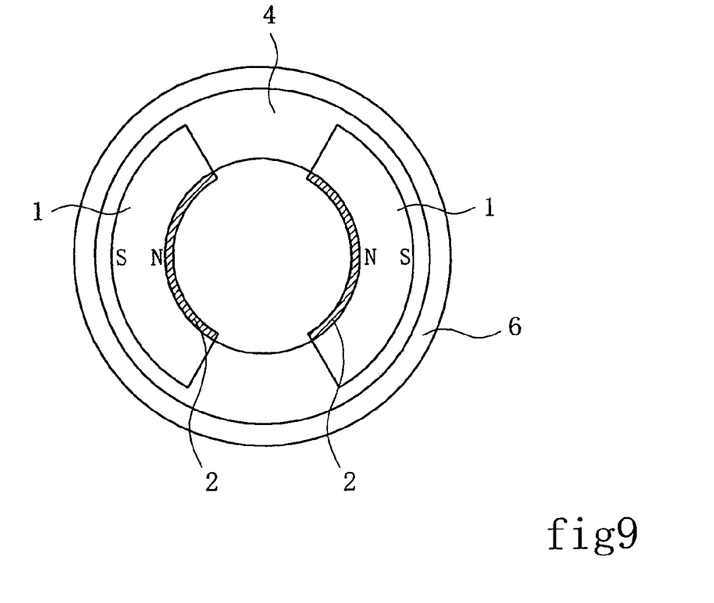
FIG. 9 is a cross-eye view of the running water activator in the embodiment 5 according to this Invention installed in stainless steel water pipe.

After applying a 50 μm thick epoxy coat containing 65% of germanium-including biotite powder (made by SEOBONG BioBestech Co., Ltd. Republic of Korea) with an average grain size of 5 μm to the inner surface of a ferrite magnet with a 800 Gauss magnetic surface force obtained by cutting a cylinder with an outer radius of 16 mm, an inner radius of 12 mm and a length of 30 mm to a third of its size and by making its inner surface the N pole, the coated magnet was fixed with the N pole at the top in a retaining detail consisting of ABS resin and push-fitted into the interior of a commercial polyvinyl chloride water main pipe (having an inner diameter of 32 mm) as shown in FIG. 9 to obtain the in-pipe running water activator according to this Invention.

Comparative Example 6

After the same ferrite magnet as that of embodiment 5 has been fixed in the retaining detail consisting of ABS resin without coating it with germanium-including biotite, said ferrite magnet was push-fitted into the interior of a commercial polyvinyl chloride water main pipe (having an inner diameter of 32 mm) in the same manner as in embodiment 5.

Embodiment 6

After 18 parts by weight of ethylene vinyl chloride resin with an average polymerization degree of 800, a tensile strength (MPa) of 47.7, and a softening point of 64 deg.C, 4 parts by weight of a germanium-including biotite powder with an average grain size of 5 μm (made by SEOBONG BioBestech Co., Ltd. Republic of Korea) and 78 parts by weight of samarium iron nitrogen powder with an average grain size of 1 μm had been prepared in a Brabender and mixed, the mixture was extrusion-molded in a calender under kneading conditions corresponding to 160–170 deg.C and 15 seconds to produce an rectangular warp shape of 5 mm width 2 mm thickness, 8 mm outer radius, 6 mm inner radius and 50 mm length and a member was fabricated for magnetic retention with a magnetic surface force of 500 Gauss in such a manner that the inner side became the N pole.

Figure 10:
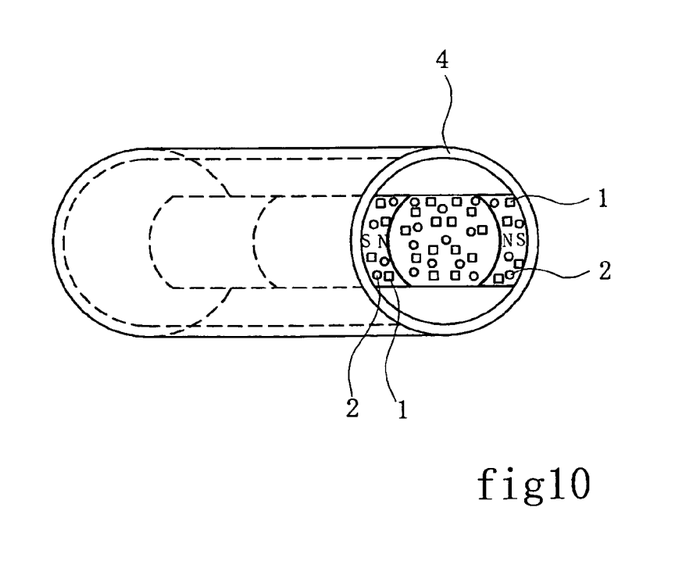
FIG. 10 is a cross-eye view of the in-pipe running water activator of the embodiment 6 of this Invention.

After two of the aforementioned members had thereupon been force-fitted as shown in FIG. 10 into a 16 mm inner diameter, 1.5 mm thickness and 65 mm length silicone rubber pipe constituting the retaining detail in such a manner that the N poles faced each other, said pipe was connected with flexible rubber to the water faucet to obtain the in-pipe running water activator of this Invention.

Comparative Example 7

After a bonded magnet with a magnetic surface force of 500 Gauss had been prepared in the same manner as in embodiment 6, using 18 parts by weight of ethylene vinyl chloride resin with an average polymerization degree of 800, a tensile strength (MPa) of 47.7, and a softening point of 64 deg.C, 4 parts by weight of a biotite powder with an average grain size of 5 μm (having a hardness of 2.7 and a specific gravity of 3.0, sampled from Pegmatite) and 78 parts by weight of samarium iron nitrogen powder with an average grain size of 1 μm and after said magnet had been push-fitted into a 16 mm inner diameter, 1.5 mm thickness, and 65 mm length silicone pipe, said pipe was connected to a water faucet.

Embodiment 7

Figure 11:
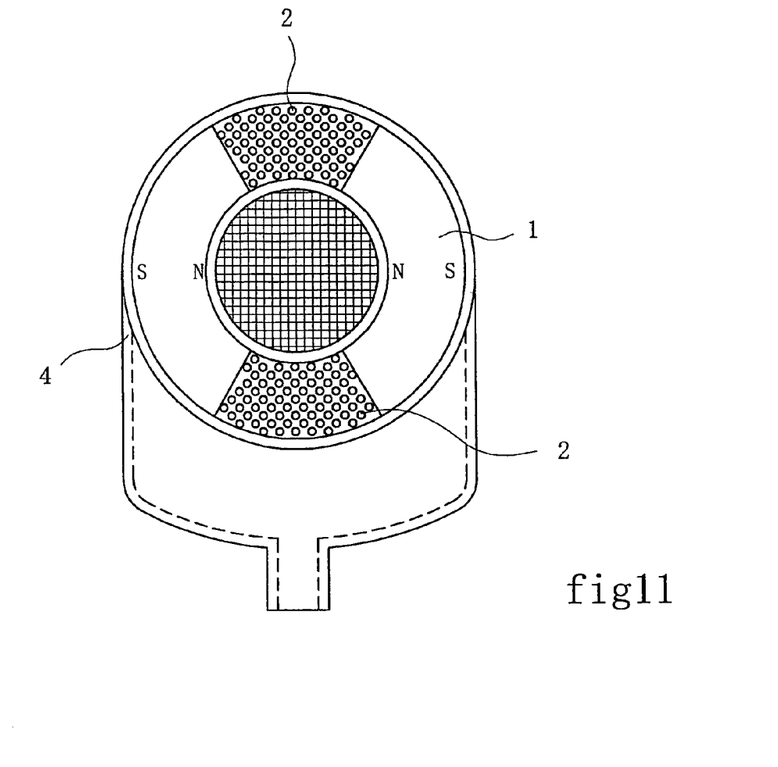
FIG. 11 is a front view of the in-pipe running water activator of the embodiment 7 of this Invention.
Figure 12:
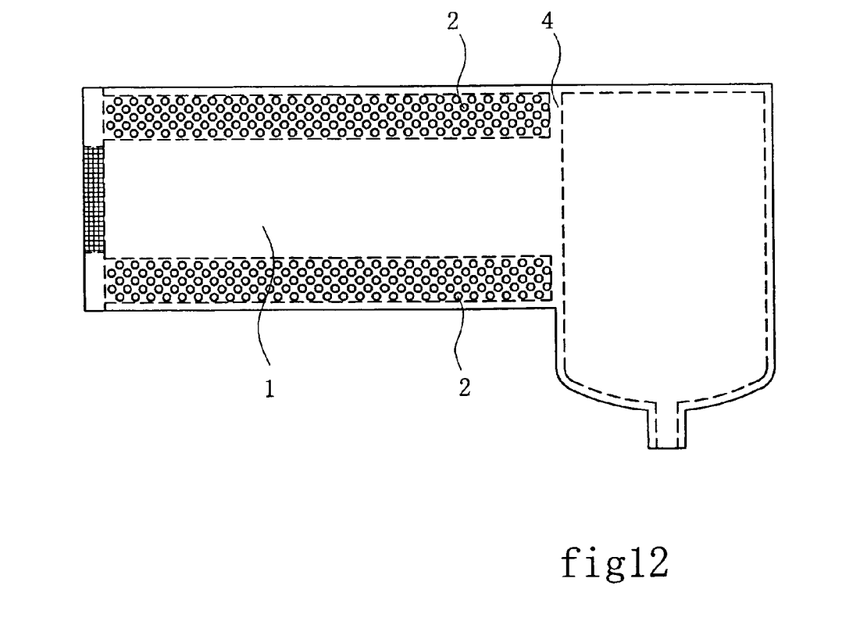
FIG. 12 is a lateral view of the in-pipe running water activator of the embodiment 7 of this Invention.

Two neodymium iron boron magnets with a magnetic surface force of 2800 Gauss and the inner side whereof constituted the N pole and which magnets had a shape corresponding to a third of a cylinder with an outer radius of 16 mm, an inner radius of 12 mm, and a length of 65 mm, were arranged in such a manner that the N poles of the two magnets faced each other and said magnets were then filled, together with 10 g of germanium-including biotite (made by SEOBONG BioBestech Co., Ltd. Republic of Korea), into a double-container type retaining detail consisting of SUS316L stainless steel, and thereupon said detail was covered with a 100 mesh SUS316L stainless steel wire mesh whose outer frame consisted of colorless transparent acrylic resin panels to obtain the in-pipe running water activator according to this invention as shown in FIGS. 11 and 12.

Comparative Example 8

Two neodymium iron boron magnets with a magnetic surface force of 2800 Gauss and the inner side whereof constituted the S pole and having the same shape as the magnets of embodiment 7 were arranged in such a manner that the S poles of the two magnets faced each other and said magnets were then filled and sealed, together with 10 g of germanium-including biotite (made by SEOBONG BioBestech Co., Ltd. Republic of Korea), in the same retaining detail as that of embodiment 3 consisting of SUS316L stainless steel

Embodiment 8

After a 60 mm×30 mm×5 mm strontium ferrite magnet with a magnetic surface force of 900 Gauss has been attached with an epoxy adhesive, with the N pole at the top, to the inner side of an L-shaped ABS resin plate whose upright part had a size of 20 mm×30 mm×2 mm and whose flat part had a size of 64 mm×30 mm×2 mm, this was baked on to a 0.6 mm thick iron plate (having a size of 60 mm×30 mm) with a mixture consisting of 60% of germanium-including biotite powder (made by SEOBONG BioBestech Co., Ltd. Republic of Korea) with an average grain size of 5 μm and 40% of an oil-based 1 liquid type acrylic resin paint and the member holding the finished plate with a 60 μm thick paint coat by magnetic force was completed.

Figure 13:
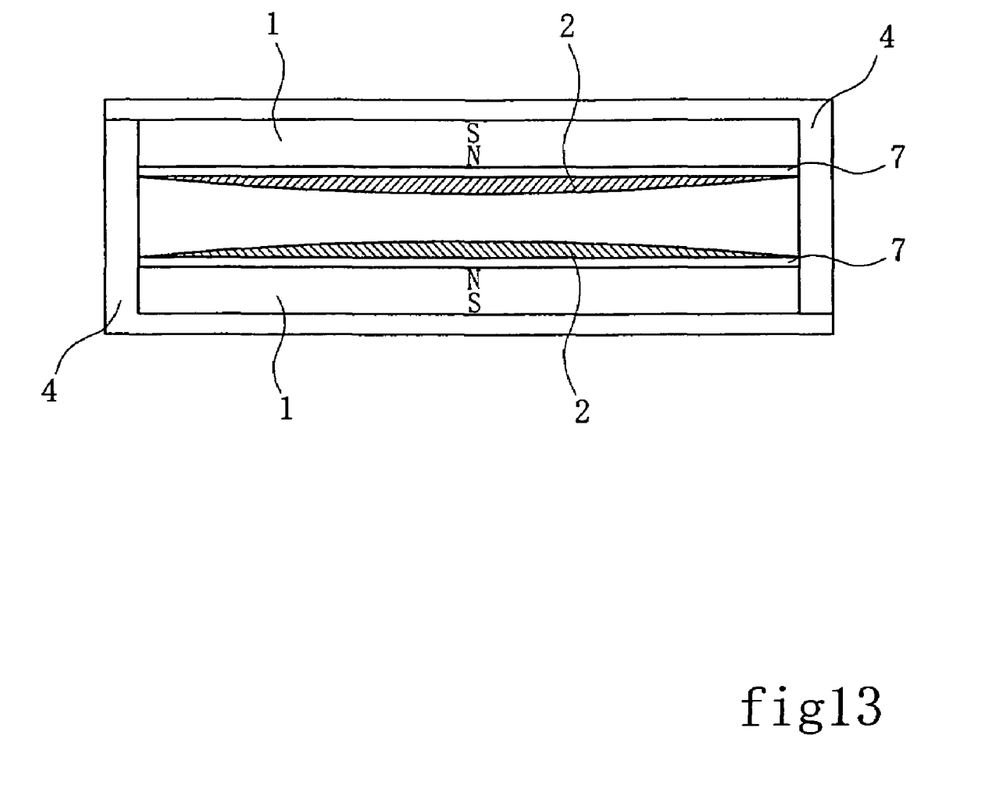
FIG. 13 is a front view of the in-pipe running water activator of the embodiment 8 of this Invention.

Thereupon these two members were arranged with their N poles facing each other and fixed in the glued box-type retaining detail as shown in FIG. 13.

Comparative Example 9

The same arrangement as in embodiment was used with the N poles facing each other but with attaching an iron plate with a baked-on acrylic paint containing germanium-including biotite powder, and the detail was fixed in the box-shaped protection similar to embodiment 8.

Comparative Example 10

One strontium ferrite magnet identical to the one described in embodiment 8 was attached with the N pole at the top and another such magnet with the S pole at the top were attached to the inner side of an L-shaped ABS resin plate. Thereupon an iron plate with a baked-on acrylic paint containing germanium-including biotite powder was attached in the same manner as in embodiment 8 and fixed in the box-shaped retaining detail with the N and S poles facing each other, in the same manner as in embodiment 8.

Application Example 4

The in-pipe running water activator according to embodiment 5 of this Invention and the magnet device according to comparative example 6 were installed somewhere in the water supply pipe on the one hand, and on the other the in-pipe running water activator according to embodiments 6–8 of this Invention and the magnet device according to comparative examples 7–10 were located on the outermost part of a faucet on a water supply pipe (used in all cases within Yachiyo City, Chiba Prefecture for supply water and river water), whereupon water samples taken immediately after the water had been allowed to flow were taken in 500 ml PET bottles each and stood four hours at a constant controlled temperature of 20 deg. C.

Following this, taste evaluation was performed by ten evaluators, the water's surface tension was measure by the Dunuit Method and the water samples were compared for their re-aggregation after forced salad oil dispersal. The evaluation results obtained in accordance with the following assessment criteria are shown in Table 6.

(1) Taste Assessment

⊚ All of the ten taste evaluation members judge that the water lacks this irritation of chlorine and has a mellowed taste.

○ Seven to nine of the ten taste evaluation members judge that the water lacks this irritation of chlorine and has a mellowed taste.

Δ Five to six of the ten taste evaluation members judge that the water lacks this irritation of chlorine and has a mellowed taste.

× Four or fewer of the ten taste evaluation members judge that the water lacks this irritation of chlorine and has a mellowed taste.

(2) Surface Tension 100 ml each of the water samples were introduced into a beaker and the surface tension was measured with a Dunuit surface tensiometer at 20 deg. C.

(3) Re-Aggregation after Salad Oil Dispersal 50 g each of the water samples were introduced into a test tube at 20 deg. C. and 2 g of salad oil in which an oil-dissolving dye (Oil Red was used) had been dissolved were added. After this the test tube contents were manually shaken 30 times and stood for five minutes at a constant temperature of 20 deg. C. for subsequent observation.

TABLE 6

| Water sample | Taste Assessment | Surface tension (20 deg, C) | Re-aggregation after forced dispersal |
| --- | --- | --- | --- |
| Supply/River water | | 69.5 mN cm2 | Reaches completion |
| Supply water passing through the running water activator of embodiment 5 | ⊚ | 69.5 | Does not reach completion |
| Supply water passing through the running water activator of embodiment 6 | ⊚ | 69.5 | Does not reach completion |

TABLE 6-continued

| Water sample | Taste Assessment | Surface tension (20 deg, C) | Re-aggregation after forced dispersal |
|---|---|---|---|
| Supply water passing through the running water activator of embodiment 7 | ◉ | 69.4 | Does not reach completion |
| Supply water passing through the running water activator of embodiment 8 | ◉ | 69.5 | Does not reach completion |
| Supply water passing through the magnet device of comparative example 6 | Δ | 69.5 | Reaches completion |
| Supply water passing through the magnet device of comparative example 7 | X | 69.5 | Reaches completion |
| Supply water passing through the magnet device of comparative example 8 | Δ | 69.5 | Reaches completion |
| Supply water passing through the magnet device of comparative example 9 | X | 69.5 | Reaches completion |
| Supply water passing through the magnet device of comparative example 10 | Δ | 69.5 | Reaches completion |

As can be seen from Table 6, the running water passing through the in-pipe running water activator of this invention lower the surface tension, a critical property of supply and raw water; and because it excites resonance vibration of the water molecules it has a relative mitigating effect on the irritating action of chlorine on the tongue so that the water assumes a more mellowed taste.

Application Example 5

The in-pipe running water activator according to embodiment 5 of this invention and the magnet device according to comparative example 6 were each connected and water kept running for a continuous period of use of one month in a fried pork and fried chicken restaurant that is open for 25 days a month. During this period, the changes occurring in the condition of the grease trap were observed. The results are presented in Table 7.

TABLE 7

| | Changes in grease trap condition | |
|---|---|---|
| Water sample | After 15 days continuous water use | After 30 days continuous water use |
| Supply water | Organic contaminants have become greasy and block the sewage. | Organic contaminants have become greasy and block the sewage |
| Supply water passing through the running water activator according to embodiment 5 | Oil part has separated from the organic contaminants that have become greasy. | The grease trap doe not become blocked and wastewater flows into the sewage without problem |
| Supply water passing through the magnet unit according to comparative example 6 | Organic contaminants that have become greasy block the sewage | Organic contaminants that have become greasy block the sewage. |

As can be seen from Table 7, it has been established that the resonance vibration effect of the water molecules of the supply water passing through the running water activator according to this Invention becomes apparent and is fully effective in aiding smooth operation of the grease trap.

Application Example 6

The in-pipe running water activator according to this invention and the magnet device according to comparative example 7, respectively, were connected to the outlet of water cleaning unit with an activated carbon filter layer. After this, the water was filled into a coffee-making machine (made by ARCO, Switzerland) that has been filled with coffee beans (La Terra d'oro PRESTIGE) and the coffee was extracted at 85 deg. C. for 30 seconds.

The coffee liquid obtained from the extraction process was tested for its physical properties, including specific gravity and viscosity and analyzed by fast liquid chromatography (FLC) to assay the extraction level of the coffee's main constituent caffeine per 100 g of coffee bean input. The results are presented in Table 8.

TABLE 8

| Water sample | Specific gravity 20° C./4° C. | Viscosity (20° C.) | Caffeine extraction rate |
|---|---|---|---|
| Supply water | 1.005 | 2 mmPa/sec | 0.061 g/100 g |
| Supply water passing through the running water activator according to embodiment 5 | 1.006 | 3 | 0.067 |
| Supply water passing through the magnet unit according to comparative example 6 | 1.005 | 2 | 0.061 |

As can be seen from Table 8, it has been established that the purified water that has passed through the running water activator according to this invention is much more effective for making a coffee extract solution than other purified water. This superiority can also be discerned, in a quantitative manner, from the taste and aroma qualities.

Application Example 7

After connecting the in-pipe running water activator according to embodiment 7 of this Invention and the magnet device according to comparative example 8 to the water faucet of a water pipe by means of an extension hose, the water was allowed to flow through and sprinkled onto spinach that had been picked and left placed on a 50 mesh iron mesh dish at 15 deg. C. for 24 hours.

In addition, samples of the different waters were taken in a 1 liter beaker and tomatoes that had been picked and left at 5 deg. C. for 120 hours were immersed in the water samples for 48 hours to observe the changes in the tomatoes' condition during this time. The results are presented in Table 9.

TABLE 9

| Water sample | Condition of spinach after 24 hours | Conditions of tomatoes after 4 hours |
|---|---|---|
| Supply water | Leaf part not firm enough (wilting) | Destroyed and releasing an unpleasant smell. |
| Supply water passing through the running water activator according to embodiment 7 | Leaf part total recovered from wilting. | Peel regained firmness and tomato retained its shape |

TABLE 9-continued

| Water sample | Condition of spinach after 24 hours | Conditions of tomatoes after 4 hours |
|---|---|---|
| Supply water passing through the magnet unit according to comparative example 8 | Leaf part not firm enough (wilting | Softening. |

As can be seen from Table 9, it has been established that the supply water that has passed through the running water activator according to this Invention exerted a physiological activation and promoting effect beneficial for vegetable foods thanks to the resonance vibration of the water molecules.

Application Example 8

The in-pipe running water activator according to embodiment 7 of this Invention and the magnet device according to comparative example 8 were separately and severally connected and maintained connected to the flush water faucet of the flush toilet of a room using the supply water from the rooftop water cistern tank on a nine-storied 20-year old building (with an average of three persons working in the room five days a week from 9 a.m. until 7 p.m.) and the water was allowed ton run through for use of the toilet. The cleanliness of the ceramic toilet bowl was observed during this period. The results are presented in Table 10.

TABLE 10

| Water sample | Black mold appearing after use of water sample (for 2 days) | Accumulation of iron rust |
|---|---|---|
| Supply water | Appeared. | Adhered tenaciously and increase as the days went by. |
| Supply water passing through the running water activator according to embodiment 5 | Did not appear | Tended to peel off and only a small amount accumulated. |
| Supply water passing through the magnet unit according to comparative example 6 | Appeared | Did not seem to peel off and gradually adhered and increased |

As can be seen from Table 10, it has been confirmed that the supply water from the running water activator of this Invention exhibits a proper cleaning action even without the addition of detergents.

Application Example 9

The in-pipe running water activator according to embodiment 8 of this Invention and the magnet devices according to comparative examples 9 and 10 were connect to the outlets of three of the total of four pump-operated filtering and circulating units installed at the top of four 45 cm×29.5 cm×29.5 cm aquariums into which two carp (body length: 10 cm), five bitter lings (fish) (body length: 3 cm) and five motsugo (fish) (body length: 7 cm) had been placed and which had been exposed to direct sunlight shining through a single window pane to permit green algae to grow all over the water surface, and the water in the fish tanks was allowed to circulated for two months to investigate the adhesion of green algae and the effect of the circulating water on the green algae. The results are presented in Table 11.

TABLE 11

| | Effect on green algae | |
|---|---|---|
| Water sample | After the lapse of 1 month | After the lapse of 2 months |
| Blank (Circulating water in aquarium without connecting the unit) | Algae remaining attached to the glass | Amount of accreting green algae continued to increase |
| Circulating water passing through the running water activator according to embodiment 8 | Green algae accreting to the glass peeled off. | Inhibited green algae accretion |
| Circulating water passing through the magnet unit according to comparative example 9 | Algae remaining attached to the glass | Amount of accreting green algae continued to increase. |
| Circulating water passing through the magnet unit according to comparative example 10 | Algae remaining attached to the glass | Amount of accreting green algae continued to increase. |

As can be seen from Table 11, it has been confirmed by way of comparison that the circulating water passing through the running water activator of this Invention that utilizes a combination of the repulsive forces of the mutually opposing N poles of the permanent magnet and the infra-red radiation emitted at low temperature from the germanium interspersed between the layers of the biotite, has a discreet energy state and that it is most beneficial for the correct use of the aquarium thanks to this effect.

Panel Test Example 3

For the test, 40 male or female respondents aged between 10 and 70 years were randomly selected. Samples of 100 milliliters each of a commercially marketed tomato juice product (manufactured by Kagome Co., Ltd., edible fiber content 0.72%) maintained at 5 deg. C. were poured into ten glass cups, either directly or after a single pass through the in-pipe running water activator according to the invention or after a single pass through the magnet devices according to comparative examples 9 and 10, respectively.

Thereupon the ten respondents were requested to taste each type of the tomato juice samples and assess the sensation profile of the tomato juice in the mouth and its odor qualities. The results are presented in Table 12 in accordance with the assessment criteria described herein below.

(1) Sensation Profile of Tomato Juice in the Mouth

The criteria for evaluation were as follows.

A. All of the ten respondents judge that the tomato juice has acquired a smooth taste and is easy to drink.

B. Seven to nine of the ten respondents judge that the tomato juice has acquired a smooth taste and is easy to drink.

C. Five to six of the ten respondents judge that the tomato juice has acquired a smooth taste and is easy to drink.

D. Four or fewer of the ten respondents judge that the tomato juice has acquired a smooth taste and is easy to drink.

(2) Smell Sensation

⊚ All of the ten respondents judge that the tomato juice has lost its offensive raw smell.

○ Seven to nine of the ten respondents judge that the tomato juice has lost its offensive raw smell.

Δ Five to six of the ten respondents judge that the tomato juice has lost its offensive raw smell.

× Four or fewer of the ten respondents judge that the tomato juice has lost its offensive raw smell.

TABLE 12

| Sample of aqueous solution | Sensation in the mouth | Smell sensation |
|---|---|---|
| Blank (Untreated tomato juice) | D | X |
| Tomato juice passing through the running water activator according to embodiment 8 | A | ⊚ |
| Tomato juice passing through the magnet unit according to comparative example 9 | D | X |
| Tomato juice passing through the magnet unit according to comparative example 10 | C | |

As can be seen from Table 12, it has been confirmed that the tomato juice has acquired a desirable or appetizing condition for those who like to drink tomato juice after passing through the in-pipe running water activator according to this invention.

Panel Test Example 4

For the test, 40 male or female respondents aged between 50 and 70 years and suffering from aching knee-joints, and twenty thereof had the in-pipe running water activator according to embodiment 4 of this invention attached to immediately below the head of their knee joints with the N poles facing inward by winding the running water activator around the knee joint head over a width of 7 cm and keeping it in situ for 12 hours during the day. For comparison, the other 20 respondents had four commercially available heat-releasing thermo-patches (using a 7 cm×5 cm product made by Lotte Electronic Industry Co., Ltd. and consisting of iron powder, wood meal, water, table salt, and activated carbon) attached immediately below their knee-joint heads and wound with covered with cotton gauze. The product was kept in situ for 12 hours during the day in a similar manner.

Thereupon the respondents were requested to describe the extent to which they felt their gonalgia (knee-joint paint) had been relieved on removal of the test sample product and how the felt they were able to walk the following day after their night rest. The results are presented in Table 13 in accordance with the assessment criteria described herein below.

(1) Extent of Relief of Knee-Joint Pain

The criteria for evaluation were as follows.

A. Fifteen or more of the total of the twenty respondents judge that they felt a relief from their knee-joint pain.

B. Eleven to fourteen of the total of the twenty respondents judge that they felt a relief from their knee-joint pain.

C. Seven to ten of the total of the twenty respondents judge that they felt a relief from their knee-joint pain.

D. Six or fewer of the total of the twenty respondents judge that they felt a relief from their knee-joint pain.

(2) Walking Sensation the Following Day

⊚ Fifteen or more of the total of the twenty-respondents judge that they could walk easily.

○ Eleven to fourteen of the total of the twenty respondents judge that they could walk easily.

Δ Seven to ten of the total of the twenty respondents judge that they could walk easily.

× Six or fewer of the total of the twenty respondents judge that they could walk easily.

TABLE 13

| Test sample | In case of remission from knee-joint pain | Feeling when walking the next day |
|---|---|---|
| Running water activator of embodiment 4 | A | ⊚ |
| Commercial heat-releasing insulator | D | X |

As can be seen from Table 13, it has been confirmed that the in-pipe running water activator according to this invention offers the advantage that it emits infrared radiation under normal temperature conditions on to the blood vessels in the knee joint and thereby helps to keep warm from within the body so that it is safer without effort than the conventional thermo-products based on the propagation of heat from outside through the generation of heat, and that furthermore, this warming condition can be continuously applied since the heat remains within the optimum temperature range for the body without ever surpassing it so that the flow of the blood as a aqueous fluid can be activated effectively over a long time and the function of the knee joint can be restored to normal.

EFFECT OF THE INVENTION

The in-pipe running water activator device using the in-pipe running water activation method according to this Invention applies a physical effect consisting of the propagation of energy with respect to water molecules passing through an arrangement in which the N poles of a permanent magnet are positioned in such a manner as to face each other and in which further more biotite that contains interstitial germanium and that is capable of emitting infrared radiation at low-temperature conditions is placed in the vicinity of the repulsive magnetic field generated in this manner. The device in accordance with this Invention can be used on a semi-permanent basis solely by placing it either directly or indirectly in to the water pipe, and this without adding any chemical agents whatsoever or without any need for the simultaneous present of any consumable materials.

With the use of this invention, it is therefore possible to produce in a simple and low-cost manner water of a favorable quality and high physiological activity with a sense of total safety. The invention is therefore beneficial not only for household water such as tap water and beverages but also for water quality improvement including industrial cleaning water requiring extraction, coagulation, and separation treatment, health-promoting agricultural cultivation water, and fish-farming water as well as for the promotion of blood flow in humans and animals.

What is claimed is:

1. An in-pipe running water activation method comprising the steps of
    (a) arranging N poles of permanent magnets in mutually opposing positions in a water supply pipe, a water circulation pipe, a faucet, or an extension fitting, thereby inducing a repulsive magnetic field in the pipe, and
    (b) emitting infrared radiation from germanium-including biotite in close proximity to a surface of the permanent magnets.

2. A method of in-pipe water activation in accordance with claim 1, wherein the germanium-including biotite is powder coated on the surface of the permanent magnets or coated onto a ferromagnetic sheet attached to the permanent magnets.

3. An in-pipe running water activator wherein a permanent magnet (1) having a north pole of the magnet bonded with germanium-including biotite is positioned on an inner surface (4) of a roughly U-shaped compartment of a retaining detail having one or more auxiliary retaining details (3) protruding outwardly from the roughly U-shaped compartment in a manner suitable for clamping onto a pipe, the north pole of the permanent magnet facing a direction in which the one or more auxiliary details protrude to clamp onto the pipe.

4. An in-pipe running water activator according to claim 3 wherein the permanent magnet is composed of magnetic strips having bonded thereon a paint film comprising the germanium-including biotite and a resin-type paint.

5. An in-pipe running water activator according to claim 3, wherein a bonded magnet molding comprising the germanium-including biotite powder and ferromagnetic powder is bonded to the permanent magnet.

6. An in-pipe running water activator according to claim 3, wherein the permanent magnet (1) has the germanium-including biotite attached to mutually opposing N poles and is pressure-fitted onto a retaining detail (3).

7. An in-pipe running water activator according to claim 6 wherein the permanent magnet is composed of a magnetic board bonded to a paint film comprising the germanium-including biotite powder and a resin paint.

8. A method of in-pipe water activation in accordance with claim 1, comprising the additional step of bringing the germanium-including biotite, in powder or granular form, into movable contact with the permanent magnet.

9. A method of in-pipe water activation in accordance with claim 1, comprising the additional step of mixing the germanium-including biotite with a ferromagnetic powder to form a mixture, and bonding the mixture to the magnets by molding.

10. An in-pipe running water activator wherein a permanent magnet having a north pole coated with germanium-including biotite granules is positioned in a box-shaped retaining detail (11) having one or more auxiliary details protruding outwardly from the box-shaped retaining detail in a manner suitable for clamping onto a pipe, the north pole of the permanent magnet facing a direction in which the one or more auxiliary details protrude to clamp onto the pipe.

11. An in-pipe running water activator according to claim 10 comprising at least two retaining details containing the permanent magnets coated with the germanium-including biotite powder are arranged on the water transporting pipe in an opposing position of the north poles by having the one or more auxiliary details of the retaining detail clamped with the one or more auxiliary details of an adjacent retaining detail on the water transporting pipe.

12. A method of promoting blood flow in a mammal comprising the steps of implanting on or in the mammal at least two magnets attached so that N poles are inwardly facing, said magnets having bonded thereon a bonded magnet molding comprising a germanium-including biotite powder and a ferromagnetic powder.

* * * * *